(12) United States Patent
Teichmann et al.

(10) Patent No.: US 11,981,315 B2
(45) Date of Patent: May 14, 2024

(54) METHOD AND DEVICE FOR ACTIVATING A FLUID SOLENOID VALVE

(71) Applicant: ZF CV Systems Europe BV, Brussels (BE)

(72) Inventors: Andreas Teichmann, Isernhagen (DE); Christian Schrader, Peine (DE)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 18/045,329

(22) Filed: Oct. 10, 2022

(65) Prior Publication Data

US 2023/0109866 A1    Apr. 13, 2023

Related U.S. Application Data

(63) Continuation of application No. PCT/EP2021/058999, filed on Apr. 7, 2021.

(30) Foreign Application Priority Data

Apr. 8, 2020    (DE) ...................... 10 2020 109 880.4

(51) Int. Cl.
*B60T 8/36* (2006.01)
(52) U.S. Cl.
CPC ............ *B60T 8/367* (2013.01); *B60T 8/3635* (2013.01); *B60T 8/362* (2013.01)
(58) Field of Classification Search
CPC ........ B60T 8/367; B60T 8/36; F16K 31/0675; F16K 37/0041; F16K 31/0679
USPC ..................... 303/119.1; 251/129.04, 129.15
See application file for complete search history.

(56) References Cited

U.S. PATENT DOCUMENTS

| 2003/0025390 | A1* | 2/2003 | Inagaki | ................. B60T 8/4275 303/199 |
| 2009/0299592 | A1 | 12/2009 | Oehler et al. | |
| 2014/0203753 | A1 | 7/2014 | Weinl et al. | |
| 2017/0350534 | A1* | 12/2017 | Domhan | ............... H01F 7/1844 |
| 2018/0254134 | A1 | 9/2018 | Mueller et al. | |
| 2020/0041023 | A1 | 2/2020 | Goers et al. | |

(Continued)

FOREIGN PATENT DOCUMENTS

| CN | 1842452 A | 10/2006 |
| CN | 101371433 A | 2/2009 |
| CN | 103814418 A | 5/2014 |

(Continued)

OTHER PUBLICATIONS

English machine translation of EP—1291256-A2 (Mar. 2003).*

(Continued)

*Primary Examiner* — Robert A. Siconolfi
*Assistant Examiner* — San M Aung
(74) *Attorney, Agent, or Firm* — Walter Ottesen, P.A.

(57) ABSTRACT

A method for activating a fluid solenoid valve in a fluid system of a vehicle, in which, in order to set a switching mode, an activation voltage is applied to a coil arrangement of the fluid solenoid valve. The activation voltage is set depending on an operating criterion to at least two different operating modes, wherein, in a first operating mode, a current regulation of the coil current flowing through the coil arrangement is performed, and in a second operating mode, differing from the first operating mode, the activation voltage is set without the current regulation.

23 Claims, 5 Drawing Sheets

(56) References Cited

U.S. PATENT DOCUMENTS

2020/0400244 A9    12/2020    Goers et al.

FOREIGN PATENT DOCUMENTS

| | | | |
|---|---|---|---|
| CN | 107978416 A | 5/2018 | |
| CN | 110249396 A | 9/2019 | |
| DE | 3413758 A * | 10/1985 | ............... B60T 8/36 |
| DE | 39 20 064 A1 | 1/1991 | |
| DE | 198 48 960 A1 | 4/2000 | |
| DE | 103 15 585 A1 | 10/2004 | |
| DE | 103 52 853 A1 | 2/2005 | |
| DE | 102015101778 A1 * | 8/2016 | |
| DE | 10 2015 219 506 A1 | 4/2017 | |
| EP | 1 291 256 A2 | 3/2003 | |
| EP | 1291256 A2 * | 3/2003 | ............... B60T 8/36 |

OTHER PUBLICATIONS

International Search Report of the European Patent Office dated Jul. 28, 2021 for international application PCT/EP2021/058999 on which this application is based.

English translation of the Written Opinion of the International Searching Authority dated Jul. 28, 2021 for international application PCT/EP2021/058999 on which this application is based.

* cited by examiner

METHOD AND DEVICE FOR ACTIVATING A FLUID SOLENOID VALVE

CROSS REFERENCE TO RELATED APPLICATIONS

This application is a continuation application of international patent application PCT/EP2021/058999, filed Apr. 7, 2021 designating the United States and claiming priority from German application 10 2020 109 880.4, filed Apr. 8, 2020, and the entire content of both applications is incorporated herein by reference.

TECHNICAL FIELD

The disclosure relates to a method and a device for activating or actuating a fluid solenoid valve in a fluid system of a vehicle.

BACKGROUND

Pneumatic systems and hydraulic systems, in particular, in which the respective fluid is controlled and switched via fluid valves are provided as fluid systems in vehicles. Different settings can thus be made via electrical control signals through fluid solenoid valves.

An armature which opens or closes different fluid outlets is adjusted in each case in the fluid solenoid valves by energizing a coil arrangement. The armature is held here in a first switching position (normal position), in particular, by a spring action and is adjusted to the second switching position (actuated position) via a switching current (pull-in current) when the coil arrangement is energized. The armature is generally held in the second switching position against the spring action via a holding current, wherein the holding current is generally lower than the switching current (pull-in current).

The coil arrangement is generally activated via a driver circuit, in particular with bilateral driver activation, that is, via a lower driver circuit (low side switch) and an upper driver circuit (high side switch) between which the coil arrangement is connected, wherein this series circuit including the driver circuits and the coil arrangement is connected between a system voltage (supply voltage) and ground. A pulse width modulation, for example, can take place here, in which a control signal with the pulse width modulation is fed to one of the driver circuits and this switches the coil current on and off according to the pulse width information, that is, closes and opens an internal switch (for example, FET). From the applied system voltage and the set pulse width ratio of between 0% and 100%, the effectively applied activation voltage can thus be set as a product of the system voltage and the relative pulse width. The coil current generated by applying the activation voltage can be measured here so that the information relating to the activation voltage and the coil current is thus available.

Different operating modes are essentially possible for operating the coil arrangement or solenoid: in a simple setting, on the one hand, a fixed activation voltage can thus be applied by setting the pulse width depending on the system voltage. It can be ensured, in particular, that an adequate coil current is produced via a voltage control of this type. However, since the ohmic resistance of the coil arrangement is temperature-dependent, a different coil current is thus produced depending on the coil temperature.

Current regulations of the coil current are further known which can be used in both switching modes, that is, the switching procedure for adjusting the armature and also the hold mode for holding the adjusted armature. The coil current is measured here and regulated by adjusting the activation voltage, that is, in particular, by setting a relative pulse width or the PWM ratio. A more precise setting of the coil current is thus possible.

However, it is evident that the operation of a fluid solenoid valve is adversely affected at lower temperatures, in particular during frost, and the switching procedure is possibly hindered, for example, due to poorer sliding capability or lubrication, and the components to be adjusted can further stick to for example, rubber seals.

SUMMARY

It is an object of the disclosure to provide a method and a device for activating a fluid solenoid valve which enable a reliable operation under different conditions.

This object can, for example, be achieved by a method for activating a fluid solenoid valve in a fluid system of a vehicle. The method includes: applying an activation voltage to a coil arrangement of the fluid solenoid valve in order to set a switching mode, wherein the activation voltage is set in dependence upon an operating criterion to at least two different operating modes including a first operating mode and a second operating mode; wherein, in the first operating mode, a current regulation of the coil current flowing through the coil arrangement is performed, and, in the second operating mode, differing from the first operating mode, the activation voltage is set without the current regulation.

The object can, for example, also be achieved via an activation device for a fluid solenoid valve in a fluid system. The activation device includes: a driver circuit device for activating a coil arrangement of the fluid solenoid valve; a control device configured to apply an activation voltage to the coil arrangement of the fluid solenoid valve in order to set a switching mode; wherein the activation voltage is set in dependence upon an operating criterion to at least two different operating modes including a first operating mode and a second operating mode; wherein, in the first operating mode, a current regulation of the coil current flowing through the coil arrangement is performed, and, in the second operating mode, differing from the first operating mode, the activation voltage is set without the current regulation.

An arrangement including the device and the activated fluid solenoid valve, and also a fluid system having the fluid solenoid valve and the device, in particular having one or more fluid consumers such as for example, a pneumatic braking system, and also a vehicle having the fluid system are further provided.

The fluid solenoid valve is, in particular, a pneumatic solenoid valve for use in a compressed air system of a vehicle.

It is recognized according to the disclosure that current regulation is to be regarded as appropriate, particularly in an upper temperature range, and, in particular, current consumption and therefore energy consumption can be minimized, and a thermal load due to unnecessarily high currents can further be avoided or at least minimized. A first operating mode is therefore provided for this purpose. It is also recognized here, in particular, that the current regulations enable a direct adjustment of the magnetic force, since the magnetic force is proportional to the current—and not to the voltage. The temperature-dependent ohmic resistance of the coil arrangement and also of corresponding further electrical components in the circuit can be adjusted directly by regulating the coil current so that the required coil current can be set in each case for both the switching procedure, that is, the pull-in current, and the holding current.

However, it is further also recognized according to the disclosure that current regulation of this type can be disadvantageous in a lower temperature range, since the coil current does not automatically increase due to the lower resistance at the low temperature and therefore no reserve is built up to deal with the temperature-related problems at low temperatures, in particular frost; the poorer lubrication due to the higher viscosity of the lubricants and possibly adhesion effects or sticking effects on the rubber seals may result in the armature not being adjusted or not being adjusted quickly enough, that is, not being adjusted with sufficient reliability. It is furthermore also recognized that a higher coil current at lower temperatures, in particular during frost, is quite advantageous, since it can result in a local heating and therefore warming of the coil arrangement along with the armature adjusted by it and the seals. An inner area of the solenoid valve can thus be locally heated.

According to the disclosure, the current regulation is therefore advantageously no longer undertaken in a lower temperature range, that is, the first operating mode is no longer set, but instead a second operating mode is chosen in which a suitable voltage value is set. According to an embodiment, the voltage value is kept constant, that is, a constant voltage value is set. Thus, due to the decreasing ohmic resistance with dropping temperatures, the generated coil current will increase with the falling temperature and therefore produce an increased heating effect and also enable more powerful forces to adjust the armature.

An operating criterion is provided here to decide whether the first operating mode or the second operating mode is to be set. According to an embodiment, this operating criterion can be applied without direct measurement of the coil temperature, that is, the choice between the operating modes can be made without utilizing a direct measured value of the coil temperature. It is recognized here that the measurement of the coil temperature is not without problems, since direct measurements of the coil temperature are difficult and a measurement outside the coil is imprecise, since external temperatures differ significantly from the current coil temperature. It is recognized instead that the set effective activation voltage can be used as the operating criterion:

If the first operating mode of the current regulation in the upper temperature range is initially assumed, the regulated activation voltage will also decrease as the temperature decreases along with the ohmic resistance of the coil arrangement. A limit voltage, that is, a limit value of the activation voltage, can thus be used as the operating criterion; as soon as the activation voltage falls below or reaches the limit voltage, a switchover to the second operating mode can be effected and this activation voltage can be held constant.

Different sub-ranges can also be set here in the second operating mode. In particular, sub-ranges in each case having a constant voltage regulation can thus be set. Estimations of the respective coil temperature can thus be made when determining the set coil current, since the coil current increases as the temperature decreases so that different activation voltages can be set here in order to make different adjustments accordingly for the different detrimental effects in the lower temperature range, for example, to oppose different forces. Sticking effects of the rubber seals, for example, thus occur, particularly at temperatures in the frost range, so that a higher effective activation voltage can be set in a lower temperature sub-range.

The second operating mode can therefore also be subdivided into operating sub-modes.

A number of advantages are achieved according to the disclosure: current regulation advantages can be achieved, in particular the precise setting of a current value while avoiding an unnecessary current consumption and unnecessary thermal load due to excessively high currents. The current can be regulated here within a broad upper temperature range, for example, from a temperature value above 20° C.

The detrimental effect of the excessively low currents of a current regulation can further be avoided in the lower temperature range by setting the second operating mode, and both a suitable heating effect and the generation of greater forces against possible friction effects or sticking effects can also be achieved. A voltage control of this type can thus be effected, in particular, by setting a constant voltage value with little hardware outlay and simple control measures.

No unnecessarily high or abrupt loads will occur if a transition between the first operating mode and the second operating mode is set with a constant activation voltage, that is, without a jump in the activation voltage.

A reliable and precise determination, also without unnecessary measurement of the coil temperature, can be achieved by configuring the operating criterion depending only on the activation voltage.

A fluid system having a reliable fluid solenoid valve is thus also enabled, providing low energy consumption and high temperature stability and therefore reliable operation. This is advantageous, particularly for applications in a vehicle, since a variable system voltage is available here depending on the load and the supply situation, for example, generator switched on or off and different electrical consumers, and therefore the power regulation avoids these problems of unstable system voltage in the high temperature range and uses the decreasing resistance in the lower temperature range to build up switching current reserves.

A comparison of or dependence on temperature values such as, in particular, the ambient temperature and/or a device temperature or coil temperature, can further be incorporated into the operating criterion.

The fluid system can, in particular, be a compressed air system, that is, having a pneumatic solenoid valve as a fluid solenoid valve. However, hydraulic system configuration is essentially also possible.

BRIEF DESCRIPTION OF THE DRAWINGS

The invention will now be described with reference to the drawings wherein.

DESCRIPTION OF THE PREFERRED EMBODIMENTS

Figure 1A:
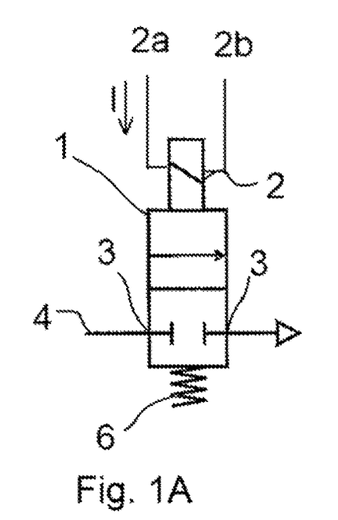
FIGS. 1A to 1C show pneumatic solenoid valves as examples of a fluid solenoid valve; 1A is a 2/2 valve, 1B is a 3/2 valve and 1C is a section through an embodiment of a 3/2 valve.
Figure 1B:
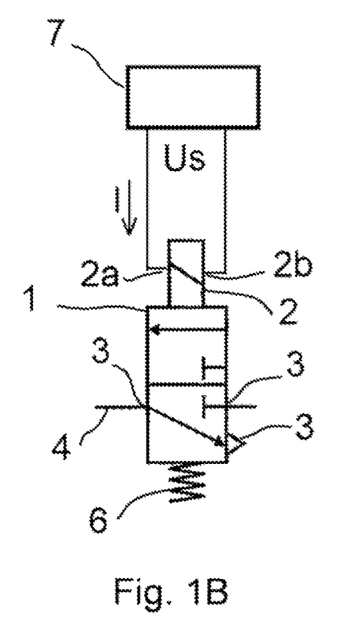

According to the block diagram shown in FIG. 1A and the example of a cross section shown in FIG. 1B, a pneumatic solenoid valve 1 has a coil arrangement (solenoid) 2 with coil connections 2a, 2b and pneumatic connections 3 for pneumatic lines 4. According to the sectional view shown in FIG. 1C, an armature 5 is generally adjustable here by energizing the coil arrangement 2, the armature 5 generally being preloaded into a normal position by a spring 6 and being adjusted to the actuated position when energized.

Figure 1C:
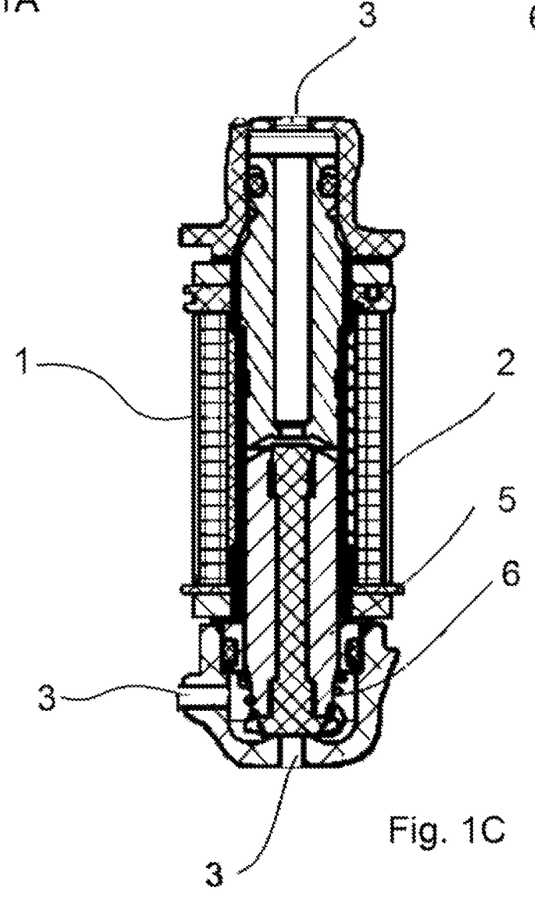

When the coil arrangement 2 is energized, the armature 5 is initially adjusted in a first switching mode S1, the switching procedure (pull-in), via a switching current IA (pull-in current) from the normal position (first switching position) to the second switching position against the spring tension of the spring 6; the armature 5 is then held in a second switching mode S2, the hold mode, via a holding current IH, wherein generally IH<IA.

The pneumatic solenoid valve 1 can be configured, for example, according to FIG. 1A as a 2/2 valve, that is, a blocking valve to block and allow through a pneumatic flow, or, for example, according to FIG. 1B, as a 3/2 switching valve. The solenoid valve 1 can essentially also be configured as a hydraulic valve.

The solenoid valve 1 is activated via an activation circuit 7 shown generally in FIGS. 1A to 1C which, in particular, outputs an effective activation voltage UA as a DC voltage via pulse width modulation (PWM). A system voltage Us is output for this purpose in time pulses or clocked, wherein the effectively applied activation voltage UA occurs as a time component or relative pulse width PW, wherein the relative pulse width PW can essentially vary between 0% and 100%. UA=Us*PW therefore applies.

Figure 2:
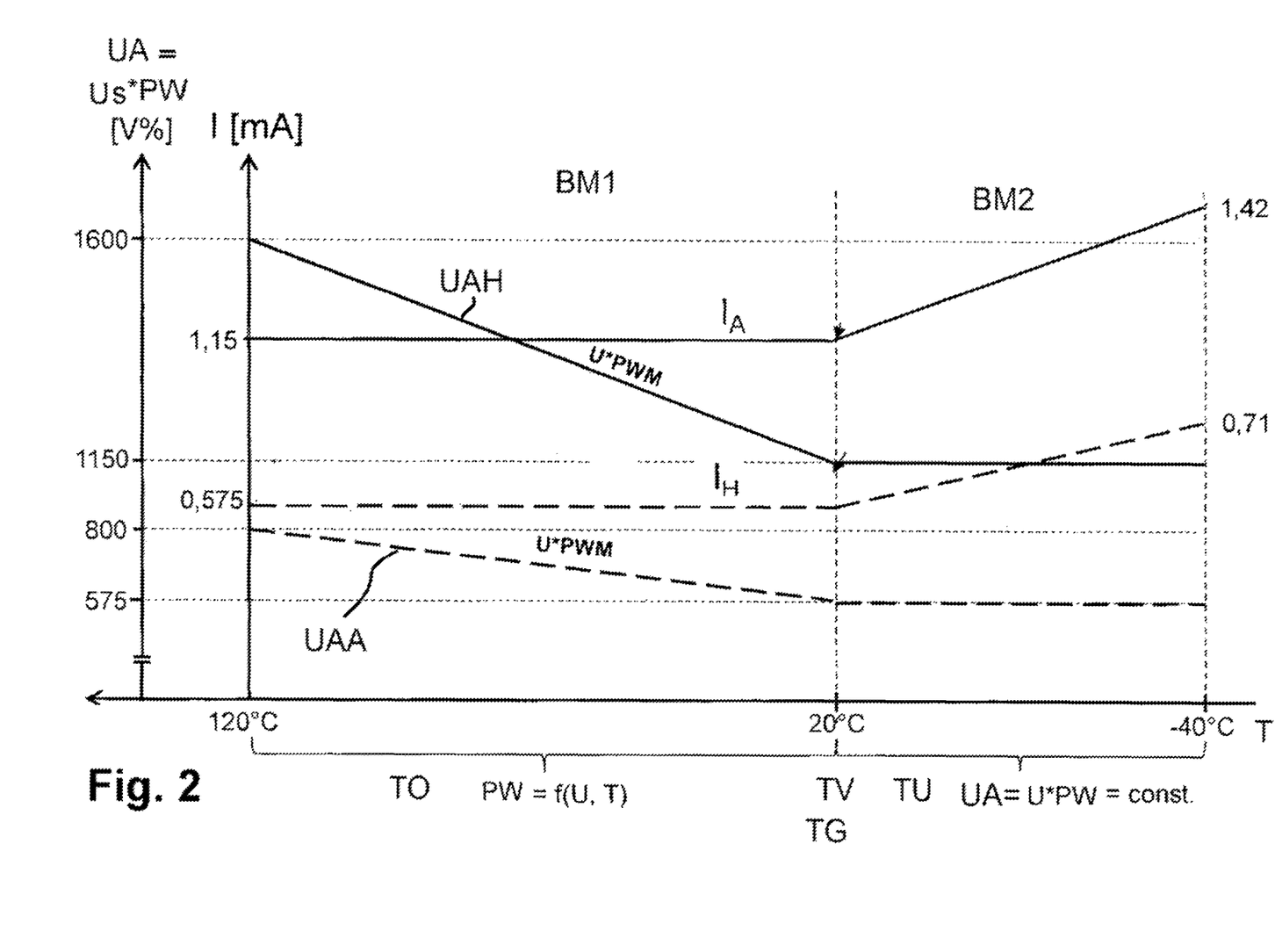
FIG. 2 shows a curve diagram of the control voltage and the coil current depending on temperature.

According to FIG. 2, two operating modes BM1 and BM2 are provided to activate the coil arrangement 2. Both operating modes, that is, the first operating mode BM1 and the second operating mode BM2, can essentially be performed here in both switching modes, that is, the first switching mode S1 of the active switching (pull-in) for the pull-in procedure of the armature 5, and also the second switching mode S2, that is, the hold mode for holding the armature 5 in the second switching position. Both switching modes S1 and S2 are also shown accordingly in FIG. 2. According to FIG. 2, the coil temperature T of the coil arrangement 2 is shown on the x-axis or horizontal axis (rising to the left) and is preferably not measured by an additional temperature sensor in the embodiments shown here. Two vertical axes or y-axes are further shown in FIG. 2:

the activation voltage UA which, as explained above, is formed as a product of the system voltage Us and the time component PW, and the coil current I flowing through the coil arrangement 2.

The switching current (pull-in current) IA and the pull-in activation voltage UAA applied for this purpose for the first switching mode S1, that is, the switching procedure or pull-in procedure of the active adjustment of the armature 5, and correspondingly the holding current IH and the holding activation voltage UAH applied for this purpose for the second switching mode S2 are shown in FIG. 2.

As shown in FIG. 2, the first operating mode BM1 is provided in an upper temperature range TO and the second operating mode BM2 is provided in a lower temperature range TU, the temperature ranges being separated for example, at a limit temperature TG=20° C., that is, for example, around room temperature.

In the first operating mode BM1, a current regulation is performed, in particular by setting a constant current value for the switching current IA or the holding current IH. In the embodiment shown, it is thus provided in the first operating mode BM1 that the switching current IA (pull-in current) is set to the current value of 1.15 mA. The activation voltage UA is thus set accordingly for this purpose.

The current value of 1.15 mA is set for the switching current IA, so that the activation voltage UA is adjusted or set accordingly. The ohmic resistance R of the coil arrangement 2 is temperature-dependent, wherein it generally increases essentially linearly with the temperature, in particular in the upper temperature range TO between 20° C. and 120° C. also. An activation voltage UA which decreases in this temperature range as the temperature decreases or has a linear increase with the temperature is thus set in each case during the regulation (loop control) of the coil current I.

The activation voltage UA is set in the second operating mode BM2. It can advantageously be kept constant, as shown, in particular, in FIG. 2: the effective activation voltage UA=U×PW is at a constant value. The coil current I changes accordingly depending on the ohmic resistance R; I=UA/R therefore applies, so that, in the diagram shown in FIG. 2, the coil current I increases in both switching modes as the coil temperature T decreases, corresponding to the linear decrease in the ohmic resistance R with a lower coil temperature T or the linear increase in the ohmic resistance with an increasing coil temperature T.

The two operating modes BM1 and BM2 can advantageously be constantly transposed into one another so that, in particular, the coil current I is constantly changed in the transition area.

The electrical values of the first switching mode S1, the switching current IA and the switching activation voltage UAA are indicated by broken lines in FIG. 2 and their values are higher than the corresponding electrical values of the second switching mode S2, that is, the hold mode, which counteract the spring tension of the spring 6 and are indicated by solid lines as the holding current IH and holding activation voltage UAH.

The indicated dimensions are provided for a pneumatic solenoid valve 1 of a pneumatic circuit of a utility vehicle in which, in the first switching mode S1 for adjusting the armature 5 in the first operating mode BM1, that is, in the upper temperature range TO between 120° C. and 20° C., a switching current (pull-in current) IA of 1.15 mA is kept constant by adjusting the activation voltage UA via the pulse width modulation PWM. The percentage values or relative pulse widths PWM of the PWM regulation depend on the respective system voltage Us; this in turn can depend on different influences in the vehicle, for example:

the present battery voltage, whether the generator (alternator) is then active and a high charging voltage of, for example, 28.8 V is or is not fed into the on-board power supply, and the ohmic resistances, the present consumption of the other consumers.

The present system voltage Us which is available to the activation circuit is set accordingly via the pulse width modulation PWM to the suitable activation voltage UA. At T=120° C., the value UA=U×PW is 1600 here, and decreases in a correspondingly linear manner to T=20° C., for example to the value UA=1150. In the second operating made BM2, as described above, the activation voltage UA is set to this constant value of the pull-in activation voltage UAA; the switching current IA which was kept constant in the upper temperature range TO by the first operating mode BM1 increases here accordingly from IA=1.15 mA at 20° C., that is, in the transition area, to for example, IA=1.42 mA at T=−40° C.

The setting or adjustment via PWM produces the following values: at T=120° C., in order to set the switching current, IA=1.15 mA is set, at a system voltage Us=32 V, a PWM width PWM32=50% is set, at Us=24 V, a PWM width PWM24=67% is set, and at a system voltage of Us=16 V, a PWM width PWM16=100% is set; these values then decrease with a correspondingly decreasing coil temperature T in the first operating mode BM1 to the lower limit at T=20° C. to the values PWM32=36%, PWM24=48% and PWM6=72%; in the second operating mode BM2, these pulse widths correspondingly remain the same.

In the second switching mode S2, that is, the hold mode, at T=120° C., PWM values of PWM32=25%, PWM24=33% and PWM16=50% are in turn set accordingly in order to set the holding current IH=0.575 mA, and are then reduced in the first operating mode BM1, with a decreasing coil temperature T to T=20° C., to PWM values of PWM32=18%, PWM24=24% and PWM16=36%, wherein these values are then correspondingly kept constant in the second operating mode BM2, that is, in the lower temperature range TU to T=−40° C.

Figure 3:
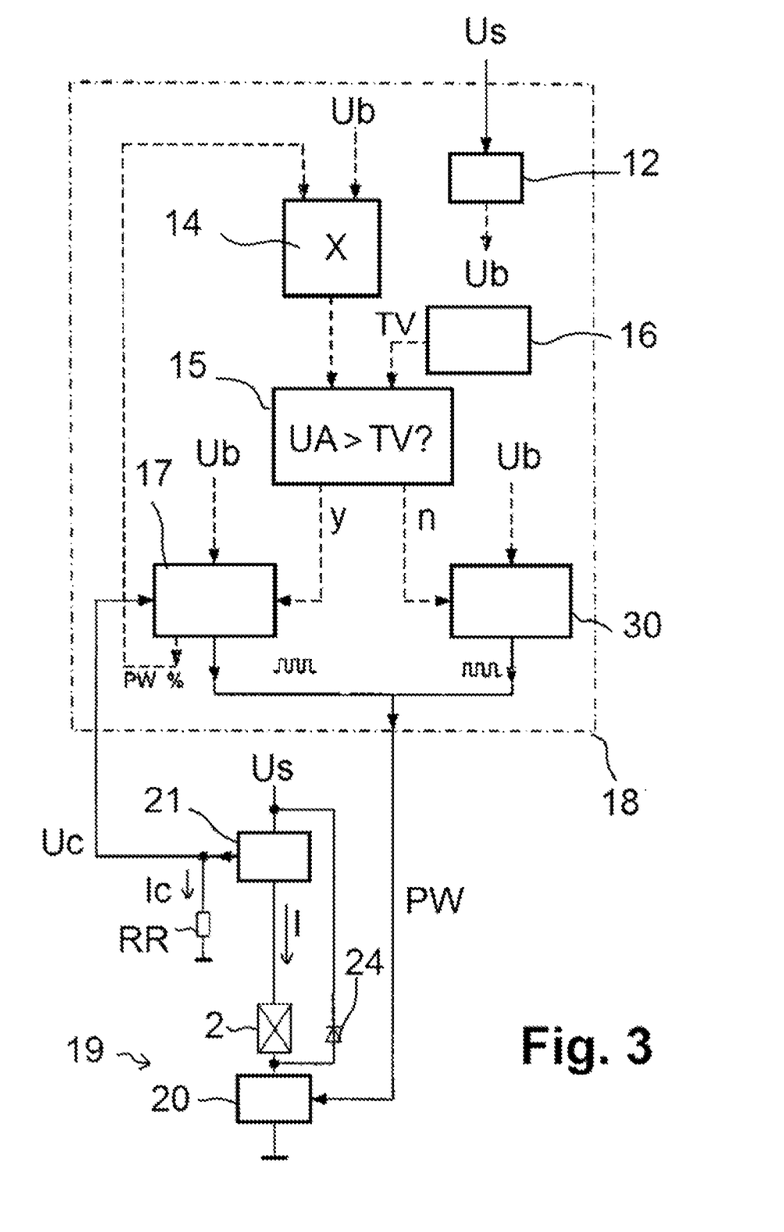
FIG. 3 shows a diagram of an embodiment with a number of method steps.
Figure 4:
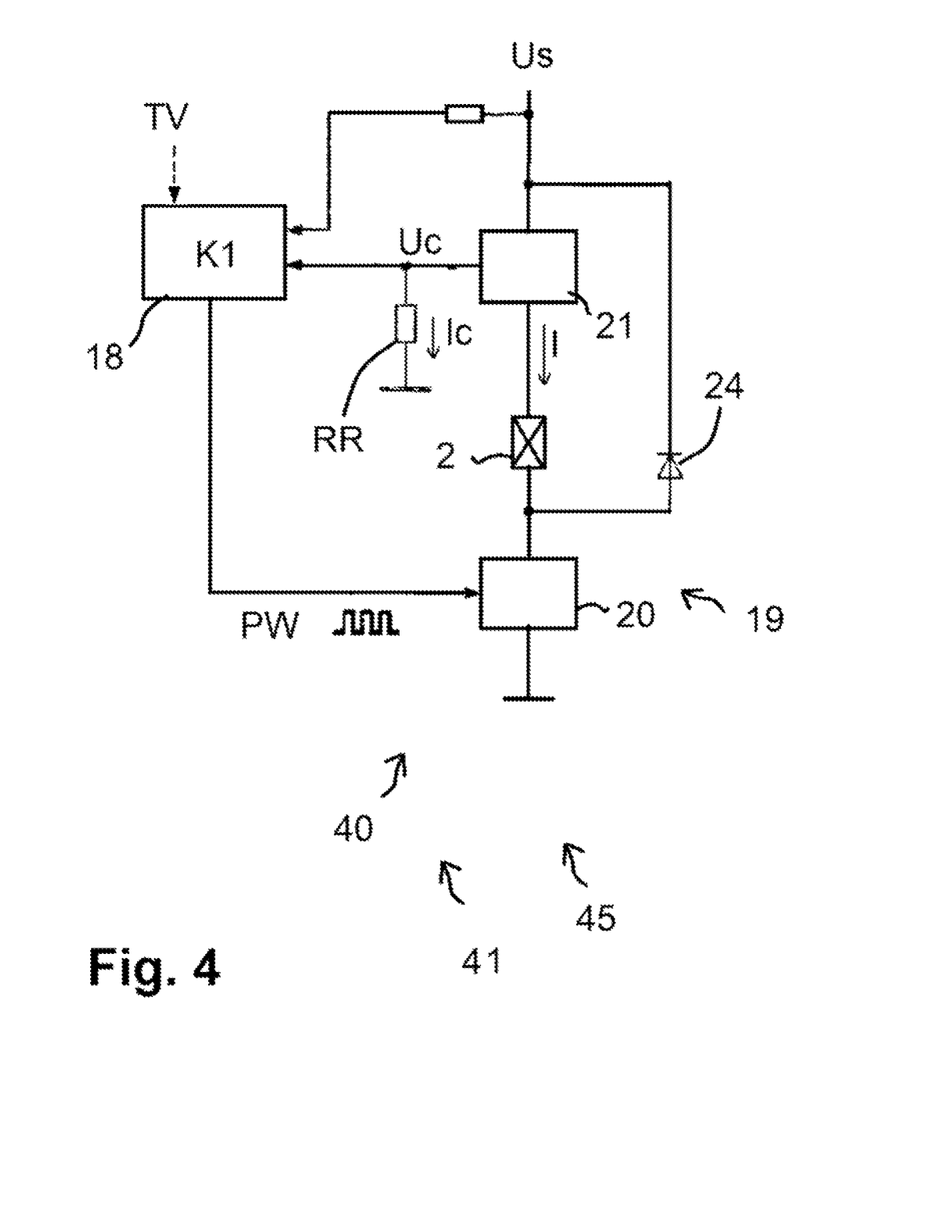
FIG. 4 shows an embodiment of a hardware configuration.

FIG. 3 shows a circuit diagram of the device and the method of an embodiment of this type; FIG. 4 shows the embodiment from FIG. 3 as a general block diagram.

According to FIG. 3, the present system voltage Us is determined by digitizing it via an analog-to-digital converter 12 so that it is present as a digital value Ub which is multiplied in the computing device 14 by a present PWM width PW so that the present activation voltage UA=Ub× PW is output to a comparison device 15 which further takes in a limit voltage TV (threshold value) from for example, a storage device 16 and compares these values with one another, that is, determines UA>TV? In the first case y, that is, UA>TV, it is thus recognized that the circuit is in the upper temperature range TO and therefore the first operating mode BM1 is to be set, so that a regulating device 17 performs the current regulation and outputs the PWM width value PW currently set in each case for the regulation to the computing device 14. The regulation is thus enabled in the first operating mode BM1 via the closed control loop, wherein the pulse width PW calculated from the difference between the actual current value and the reference current value is fed to a driver circuit 19 in order to activate the coil arrangement 2.

To do this, the driver circuit device 19 has a lower driver circuit 20 (LSS, low side switch) to which the calculated PW is preferably fed according to FIG. 3, wherein an upper driver circuit 21 (HSS, high side switch) of the driver circuit device 19 is connected accordingly to the system voltage Us, having a freewheeling diode 24 between the output of the lower driver circuit 20 and the connection of the system voltage Us, for the freewheeling current of the coil arrangement 2.

The lower driver circuit 20 or low side switch and the upper driver circuit 21 or high side switch are provided here in a conventional manner for bilateral activation of the coil arrangement 2. The freewheeling path via the freewheeling diode 24 serves to feed the energy present in the coil back into the system.

According to this embodiment, in order to measure the coil current I, a control output of the upper driver circuit 21 (HSS) is provided which outputs a control current Ic which is formed as a proportional current value of for example, ¹⁄₁₀ of the coil current I, that is, Ic=I/10, wherein this control current Ic is output via a reference resistor RR to ground. A measurement voltage or control voltage Uc can thus be tapped as Uc=Ic×RR at the control output and can be fed to the regulating device 17 which therefore indirectly measures the coil current I and sets the pulse width PW accordingly as a relative value of between 0% and 100%.

If a negative decision is made in the comparison device 15 in the UA>TV comparison, that is, the present activation voltage UA is less than the limit voltage TV, the second operating mode BM2 is then set by the coil current control device 30 according to branch n, that is, as a control to output the pulse width PWM, which is approximately inversely proportional to the system voltage, to the lower driver circuit 20.

As an alternative to the measurement circuit through the reference resistor RR with the output for the control current Ic, a current measurement, for example, can also be performed through a shunt resistor which is connected for example, between ground and the lower driver circuit 20 (low side switch) so that the coil current I is measured as a voltage drop on the shunt resistor.

According to FIG. 3, the system voltage Us is input via the analog-to-digital converter 12 as a digital value Ub of the control device 18 which is configured, in particular, as a microcontroller, wherein the control device 18 reads the value for the limit voltage TV from an internal or external storage device 16, and wherein the control device 18 further takes in the control voltage Uc according to the general block diagram shown in FIG. 4 and then sets the corresponding operating mode BM1 or BM2 according to the operating criterion K1, wherein it correspondingly either outputs the activation voltage UA directly or outputs a control signal with the relative pulse width PW to the lower driver circuit 20 which then sets the coil current I accordingly between the upper driver circuit 21 of the coil arrangement 2 representing the load and the lower driver circuit 20.

Figure 5:
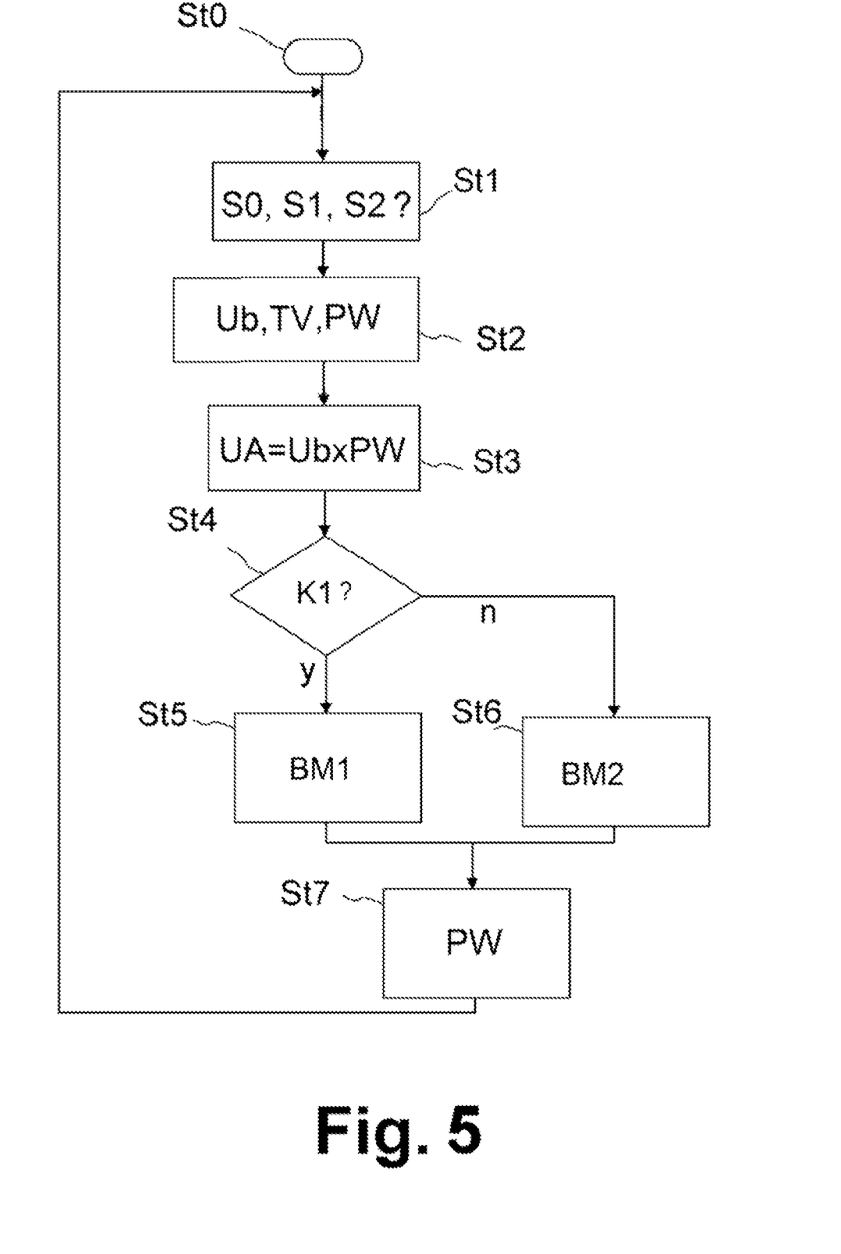
FIG. 5 shows a flow diagram according to an embodiment of a method according to the disclosure.

A method according to the disclosure is thus shown by way of example in FIG. 5.

Following the start in step St0, the switching mode is determined in step St1, that is, whether according to the idle switching mode S0, the solenoid valve 1 is not to be activated at all and thus remains in its non-energized normal position, or an activation procedure or switching procedure and therefore, according to the switching mode S1, an adjustment procedure to adjust the armature 5 is to be set, or the hold mode is set and the coil arrangement 2 is to be activated with a holding current IH as the switching mode S2.

In step St2, the available system values and measured values are then input, that is, in particular, the system voltage Us is input as a digital value Ub through digitization via the AD converter 12 and, if necessary, the limit voltage TV is further input and, if necessary, a currently set pulse width PW is input. In the following determination step St3 (computing step), the activation voltage UA is determined therefrom as UA=Ub×PW, wherein the two steps St2 and St3 can also be carried out accordingly in combination.

In the decision step St4, the operating criterion K1 is then verified, that is, to ascertain whether the activation voltage UA is above the limit voltage TV and, depending thereon, the following steps are then carried out accordingly:

if the limit voltage TV is exceeded in the decision step St4, the first operating mode BM1 of the current regulation is then implemented according to branch y in the regulating step St5 and, according to FIG. 3, the sub-steps described there are carried out accordingly for this purpose, that is, the measurement of the present coil current I, for example, via the voltage drop Uc=Ic*RR of the auxiliary output or a shunt resistor, with subsequent regulation or setting of the relative pulse width PWM as a closed control loop;

if the limit voltage TV is understepped in the decision step St4, the second operating mode BM2 is implemented according to branch n in the control step St6, and therefore a constant activation voltage UA is set, that is, the relative pulse width PWM is thus set as a function of the system voltage Us or its digitized value Ub.

In both cases, the coil arrangement 2 is then activated in each case in step St7 via the driver circuit device 19, wherein the lower driver circuit 20 of the driver circuit device 19 is set by the determined relative pulse width PW, and the method then returns to before step St2, in particular before step St1.

It is understood that the foregoing description is that of the preferred embodiments of the invention and that various changes and modifications may be made thereto without departing from the spirit and scope of the invention as defined in the appended claims.

REFERENCE NUMBER LIST (PART OF THE DESCRIPTION)

1 Fluid solenoid valve, pneumatic solenoid valve
2 Coil arrangement (solenoid arrangement)
2a/2b Coil connections
3 Pneumatic connections
4 Pneumatic lines
5 Armature
6 Spring
7 Activation circuit
12 Analog-to-digital converter
14 Computing device
15 Comparison device
16 Storage device
17 Regulating device
18 Control device
19 Driver circuit device from the driver circuits 20, 21
20 Lower driver circuit
21 Upper driver circuit
24 Freewheeling diode
30 Coil current control device
40 Fluid system, in particular compressed air system
41 Vehicle
45 Device
BM1 First operating mode
BM2 Second operating mode
I Coil current
IA Switching current (pull-in current)
IH Holding current
1c Control current
K1 Operating criterion
PW Time component, pulsewidth
R Ohmic resistance
RR Reference resistor
S1 First switching mode S1
S2 Second switching mode S2
T Coil temperature
TO Limit temperature
TU Upper temperature range
TU Lower temperature range
TV Limit voltage
UA Effective activation voltage
Us System voltage
Ub Digitized value of the system voltage Us
Uc Control voltage
UAA Pull-in activation voltage
UAH Holding activation voltage

What is claimed is:

1. A method for activating a fluid solenoid valve in a fluid system of a vehicle, the method comprising:
applying an activation voltage to a coil arrangement of the fluid solenoid valve in order to set a switching mode, wherein the activation voltage is set in dependence upon an operating criterion to at least two different operating modes including a first operating mode and a second operating mode, wherein said activation voltage includes a voltage applied during a pulling-in of the fluid solenoid valve;
wherein, in the first operating mode, a current regulation of the coil current flowing through the coil arrangement is performed, and,
in the second operating mode, differing from the first operating mode, the activation voltage is set without the current regulation.

2. The method of claim 1, wherein, in the second operating mode, the activation voltage is set independently from the coil current.

3. A method for activating a fluid solenoid valve in a fluid system of a vehicle, the method comprising:
applying an activation voltage to a coil arrangement of the fluid solenoid valve in order to set a switching mode, wherein the activation voltage is set in dependence upon an operating criterion to at least two different operating modes including a first operating mode and a second operating mode;
wherein, in the first operating mode, a current regulation of the coil current flowing through the coil arrangement is performed,
in the second operating mode, differing from the first operating mode, the activation voltage is set without the current regulation; and, wherein the activation voltage is kept constant.

4. The method of claim 1, wherein the operating criterion includes a comparison of a present activation voltage with a limit voltage or is formed by the comparison; and, wherein:
in a first case where the activation voltage exceeds the limit voltage, the first operating mode is set, and,
in a second case where the activation voltage falls below the limit voltage, the second operating mode is set.

5. The method of claim 1, wherein the operating criterion is provided without measurement of a present coil temperature.

6. The method of claim 1, wherein the fluid solenoid valve is adjustable between a normal position which is spring-preloaded by a spring and an activated position; and, the coil arrangement is activatable into at least:
an idle switching mode without energization of the coil arrangement;
a first switching mode for setting a switching current in order to adjust an armature of the solenoid valve from the normal position into the activated position; and,
a hold mode as a second switching mode for setting a holding current in order to hold the armature in an activated second switching position against the spring preloading;
wherein the switching current is greater than the holding current; and,
wherein, in the first switching mode and the second switching mode, the coil current is set in dependence upon the operating criterion.

7. The method of claim 1, wherein the first operating mode is implemented in an upper temperature range and the second operating mode is implemented in a lower temperature range, wherein a transition temperature or limit temperature lies between 10° C. and 40° C.

8. The method of claim 1, wherein the first operating mode is implemented in an upper temperature range and the second operating mode is implemented in a lower temperature range, wherein a transition temperature or limit temperature lies between 15° C. and 25° C.

9. The method of claim 1, wherein, in the second operating mode, several sub-ranges are formed, wherein a different constant voltage value is set in a lower sub-range than in an upper sub-range with a lower coil current.

10. The method of claim 1, wherein the activation voltage is generated as an effective activation voltage through pulse width modulation from a present system voltage and a relative pulse width.

11. The method of claim 10, wherein the relative pulse width is set by outputting pulse width information to a driver circuit device of the coil arrangement.

12. The method of claim 11, wherein the pulse width information is outputted to a lower driver circuit or an upper driver circuit of the driver circuit device.

13. The method of claim 10, wherein the effective activation voltage is determined by measuring a present system voltage through analog-to-digital conversion to form a digital operating voltage value which is multiplied by a set pulse width; and, wherein, in the first operating mode, the current regulation is performed by determining the effective activation voltage and setting the pulse width, and by measuring the coil current.

14. The method of claim 13, wherein the coil current is measured via a shunt resistor, or by measuring a comparative current or control current proportional to the coil current.

15. The method of claim 1, wherein a pneumatic solenoid valve in a compressed air system of a vehicle is activated as the fluid solenoid valve.

16. An activation device for a fluid solenoid valve in a fluid system, the activation device comprising:

a driver circuit device for activating a coil arrangement of the fluid solenoid valve;

a control device configured to apply an activation voltage to the coil arrangement of the fluid solenoid valve in order to set a switching mode; wherein the activation voltage is set in dependence upon an operating criterion to at least two different operating modes including a first operating mode and a second operating mode, wherein said activation voltage includes a voltage applied during a pulling-in of the fluid solenoid valve;

wherein, in the first operating mode, a current regulation of the coil current flowing through the coil arrangement is performed, and, in the second operating mode, differing from the first operating mode, the activation voltage is set without the current regulation.

17. The activation device of claim 16, wherein the solenoid valve is in a compressed air system of a vehicle.

18. The activation device of claim 16, wherein said control device has an analog-to-digital converter configured to digitize a present system voltage and to determine a digital operating voltage value; and, said control device further has a computing device and a comparison device configured to evaluate the operating criterion.

19. The activation device of claim 16, wherein said control device is configured to determine and set a pulse width for activating said driver circuit device in order to form a pulse width modulation for the coil arrangement.

20. The activation device of claim 16, wherein said driver circuit device has a lower driver circuit and an upper driver circuit between which the coil arrangement is connected; and, a series circuit comprising said upper driver circuit, the coil arrangement, and said lower driver circuit is applicable to a supply voltage.

21. An arrangement comprising the activation device of claim 16 and the fluid solenoid valve, wherein the fluid solenoid valve is configured to be activated by said activation device with the coil arrangement.

22. A fluid system for a vehicle comprising the arrangement of claim 21 and a fluid consumer, wherein said fluid consumer is configured to be switched by the fluid solenoid valve.

23. A vehicle comprising the fluid system of claim 22.

* * * * *

UNITED STATES PATENT AND TRADEMARK OFFICE
CERTIFICATE OF CORRECTION

PATENT NO. : 11,981,315 B2
APPLICATION NO. : 18/045329
DATED : May 14, 2024
INVENTOR(S) : A. Teichmann et al.

Page 1 of 1

It is certified that error appears in the above-identified patent and that said Letters Patent is hereby corrected as shown below:

In the Specification

In Column 6:
Line 59: delete "made" and insert -- mode -- therefor.

In Column 9:
Line 53: delete "1c" and insert -- Ic -- therefor.
Line 62: delete "TO Limit temperature" and insert -- TG Limit temperature -- therefor.
Line 63: delete "TU Upper temperature range" and insert -- TO Upper temperature range -- therefor.

Signed and Sealed this
Seventeenth Day of September, 2024

Katherine Kelly Vidal
*Director of the United States Patent and Trademark Office*